United States Patent [19]

Hughes

[11] Patent Number: 5,346,281
[45] Date of Patent: Sep. 13, 1994

[54] SPRING BIASED INERTIAL LATCH FOR VEHICLE SEAT ASSEMBLIES

[75] Inventor: Daniel Hughes, Mississauga, Canada

[73] Assignee: Bertrand Faure Ltd., Mississauga, Canada

[21] Appl. No.: 974,532

[22] Filed: Nov. 12, 1992

[30] Foreign Application Priority Data

Mar. 31, 1992 [CA] Canada ................................ 2064490

[51] Int. Cl.$^5$ ............................................. B60N 2/02
[52] U.S. Cl. .............................. 297/367; 297/216.14; 297/378.11
[58] Field of Search .................. 297/366, 367, 216.14, 297/216.13, 216.1, 354.1, 378.11, 378.12

[56] References Cited

U.S. PATENT DOCUMENTS

| | | | |
|---|---|---|---|
| 3,405,971 | 10/1968 | Kobrelel | 297/378.11 |
| 4,103,967 | 8/1978 | Tanka | 297/378.11 |
| 4,118,067 | 10/1978 | Tanaka | 297/378.11 |
| 4,165,128 | 8/1979 | Strowick | 297/367 |
| 4,366,984 | 1/1983 | Klueting | 297/378.11 |
| 4,634,182 | 1/1987 | Tanaka | 297/378.11 |
| 5,163,736 | 11/1992 | Aljundi | 297/378.11 |

FOREIGN PATENT DOCUMENTS 0051819  2/1977  Australia ............................. 297/367

Primary Examiner—P. Austin Bradley
Assistant Examiner—James Miner
Attorney, Agent, or Firm—Patrick J. Hofbauer

[57] ABSTRACT

A low cost, light-weight inertial latching mechanism for use in latching an automotive vehicle seatback member with respect to a cooperating seat member under collision or collision-like conditions wherein high acceleration or deceleration of the vehicle occurs, is disclosed. The latching mechanism has first and second hinged members pivotally mounted on the seat and seatback members about a common first pivot. The first hinged member has a gear rack adapted to engage a pawl means that is mounted on the second hinged member. The pawl means moves between a first latched position, a second transitional position, and a third unlatched position. A spring means is operationally interconnected between the second hinged member and the pawl means and is adapted to bias the pawl means toward said third unlatched position until forces of acceleration or deceleration above a design threshold value occur. Above that value, the inertial forces of the pawl means cause relative movement of the pawl means past the second transitional position toward the first latched position. In this first latched position, the pawl means engages the gear rack to latch the first hinged member with respect to the second hinged member.

22 Claims, 3 Drawing Sheets

SPRING BIASED INERTIAL LATCH FOR VEHICLE SEAT ASSEMBLIES

FIELD OF THE INVENTION

This invention relates to latches for use, in vehicle seat assemblies having a backrest member pivotally movable with respect to a seat member, and more particularly to inertial latches that preclude unwanted relative pivotal movement between the seatback member and the seat member under conditions of severe vehicle acceleration or deceleration, such as are encountered during vehicle collisions.

BACKGROUND OF THE INVENTION

Vehicle seat assemblies are commonly constructed so that the seatback member pivots relative to the seat member. Such pivotal movement may be rearwardly and downwardly with respect to the seat member (hereinafter referred to as "reclining" of the seatback member), thereby to allow for adjustment of the inclination angle of the seatback member to an operator selected position, or may be forwardly and downwardly relative to the seat member, (hereinafter referred to as "dumping" of the seatback member), thereby to allow for ingress and egress from the rear passenger area of a two-door vehicle. Such pivotal movement of the seatback member relative to the seat member, whether reclining or dumping, is typically accomplished through the use of a pivoting hinge mechanism which pivotally joins the seat and seatback members one to the other. Such hinge mechanisms typically incorporate at least one latching mechanism which latches the seatback member so as to restrain it in place at a desired operative angle with respect to the seat member. Such prior art latching mechanisms may be in full time latching engagement to prevent unwanted reclining or dumping, in which case the seat occupant must manually release the latching mechanism to allow pivotal movement of the seatback member. Alternatively, such latching mechanisms may be of the well-known "inertial" type which latch under the influence of inertial forces generated during very rapid vehicle deceleration. An example of the former type of latch mechanism can be seen in Canadian Patent No. 1,293,681, issued to Bertrand Faure Ltd. on Dec. 31, 1991, and an example of the latter type can be seen in U.S. Pat. No. 4,707,010 issued to Croft on Nov. 17, 1987. The teachings of both the Bertrand Faure Ltd. and Croft patents are incorporated herein by reference.

Cost considerations in the construction of vehicle seat assemblies have tended to result in modern seat latching mechanisms becoming smaller than their predecessors so as to realize material savings to the manufacturer.

Weight reduction in modern vehicles has also become an important design consideration. In this regard, it has also become common to reduce the size of the latching mechanisms used in vehicle seat assemblies.

Further, size reduction is also being emphasized by vehicle designers as they request engineers to package the aforementioned latching mechanism in increasingly smaller design envelopes.

Another solution for cost and weight reduction has been for seat assembly manufacturers to utilize a full latching mechanism on only one side of a vehicle seat assembly. Such a single-sided latching mechanism must, however, be somewhat larger than a latching mechanism designed for tandem use on each side of a seat assembly in order to adequately provide for occupant loading during collision or collision-like conditions. Accordingly, this approach to cost and weight reduction is a limited one, particularly where small design envelopes are dictated by the vehicle or seat assembly design.

It will be appreciated that the lost strength and rigidity introduced into the seat assembly by downsizing and by single-sided latching, as previously described, may lead to deformation or breakage of the seat assembly components, including the latching mechanism itself, in vehicle collisions. This is especially likely in collision impacts from the rear of the vehicle, wherein the seatback member must accelerate the mass of the torso of the seat occupant during very rapid forward acceleration. Resultingly, the seatback member and the related latching mechanism must be designed to withstand the relatively larger forces encountered in rear impact collisions. Such uncontrolled deformation or breakage can result in serious injury to the seat occupant. In frontal vehicle impacts, it will be appreciated that the occupant's torso is thrown forwardly toward the dashboard of the vehicle, so that the accelerated mass of such occupant's torso is not borne by the seatback member. As the loading of the seatback member is not so severe in frontal impacts, single-sided latching may be adequate from a safety standpoint in such collisions. However, single-sided latching is more likely to be unacceptable from a safety standpoint in the case of collisions to the rear of a vehicle or during collision-like conditions wherein high accelerative or decelerative forces may be experienced, particularly where downsizing is an inherent necessity in the design of the single-sided latching mechanism utilized.

From a safety standpoint, therefore, it will be appreciated that it is desirable to avoid the use of single-sided latching, and employ a supplemental latching mechanism that latches the seatback member with respect to the seat member during conditions of rapid vehicle acceleration or deceleration, such as are encountered during collision or collision-like conditions. Inertial actuation of the supplementary latching device in collision or collision-like situations allows the device to be simple, lightweight and inexpensive to manufacture, as it eliminates the need for the connection of slave actuation hardware between it and the master latching mechanism, while at the same time providing for an increased level of safety to the seat assembly occupant, particularly where it is designed to be actuated in a rear vehicle collision.

Such supplemental latching mechanisms have not been commonly employed to date in vehicle seat assembly designs, particularly in relation to applications intended to address the problem of rear impacts as described above. To be practical, such supplemental latching members must be compact, lightweight, inexpensive to manufacture and assemble, and provide rapid positive interlocking latching against pivotal movement, whether reclining or dumping, of the seatback member. Moreover, such a supplemental seat latching mechanism should be inertially actuated, so as not to interfere with routine pivoting motion of the seatback member during use of the vehicle, as controlled by a master latching mechanism.

It is, therefore, an object of the present invention to provide a simple, lightweight and inexpensive inertial latching mechanism for use in a vehicle seat assembly having a seatback member that moves pivotally with respect to the seat member, for latching the seatback member with respect to the seat member in the event of a vehicle collision or under collision-like conditions.

It is a further object of this invention to provide an inertial latching mechanism that is ideally suited to be used as a supplementary latching mechanism to be used in tandem with a master latching mechanism of known design on a seat assembly on the opposite lateral side of the seat assembly from said master latching mechanism so as to augment the load bearing capability of the master latching assembly, particularly under conditions of rear collision.

It is a further object of the present invention to provide an inertial latching mechanism that, when used in a vehicle seat assembly as a supplementary latching mechanism that is to be actuated in rear collisions only, allows the use of a significantly smaller and lighter master latching mechanism on the opposite lateral side of the vehicle seat assembly.

It is a further object of this invention to provide an inertial mechanism that is not subject to unlatching by way of bounce out of the latching pawl, such as may occur under load lapse conditions, which arise, for example, during a sudden reversal of vehicle direction, as during a secondary vehicle collision.

It is yet a further object of this invention to provide an inertial latching mechanism that remains it its latched configuration once latched. This feature requires the seat assembly and the latching mechanism thereon to be inspected and serviced by a qualified mechanic or technician following an activating impact, so as to allow confirmation by such mechanism techniques of the structural integrity of the seat assembly and latching mechanisms prior to re-entering the vehicle into active service.

SUMMARY OF THE INVENTION

The present invention relates to an inertial latching mechanism for use in a vehicle seat assembly having a seatback member pivotally movable with respect to a seat member, wherein said latching mechanism is used to secure said seatback member against pivotal movement relative to said seat member in a first direction when a vehicle in which said seat assembly is mounted undergoes acceleration in a generally opposite second direction greater than a design threshold acceleration value. The latching mechanism comprises first and second hinged members pivotally mounted about a common first pivot with said first hinged member having a first gear rack arranged thereon, wherein one of said first and second hinged members is mounted on one of said seat and seatback members and the other of said first and second hinged members is mounted on the other of said seat and seatback members. A pawl means having an engaging portion adapted for latching engagement with said gear rack is mounted on the second hinged member for movement between a first latched position whereat said pawl means engages said gear rack to secure said first hinged member as aforesaid, a second transitional position, and a third unlatched position whereat said pawl means is disengaged from said gear rack. A spring means is operationally interconnected between the second hinged member and the pawl means and is adapted to bias the pawl means toward the third unlatched position until said vehicle undergoes acceleration in the aforementioned second direction above said design threshold value. Above the design threshold value, the inertial forces of the pawl means overcome the spring biasing, thereby to causing relative movement of the pawl means in the first direction past the second transitional position, beyond which second transitional position the spring means is interconnected and adapted to bias said pawl means toward said first latched position.

BRIEF DESCRIPTION OF THE DRAWINGS

The above-mentioned and further objects of the present invention will become apparent from the following detailed description of a preferred embodiment of latching mechanisms according to the invention in which:

FIG. 2b is an enlarged view of a portion of FIG. 2a;

DETAILED DESCRIPTION OF THE PREFERRED EMBODIMENT

Figure 1:
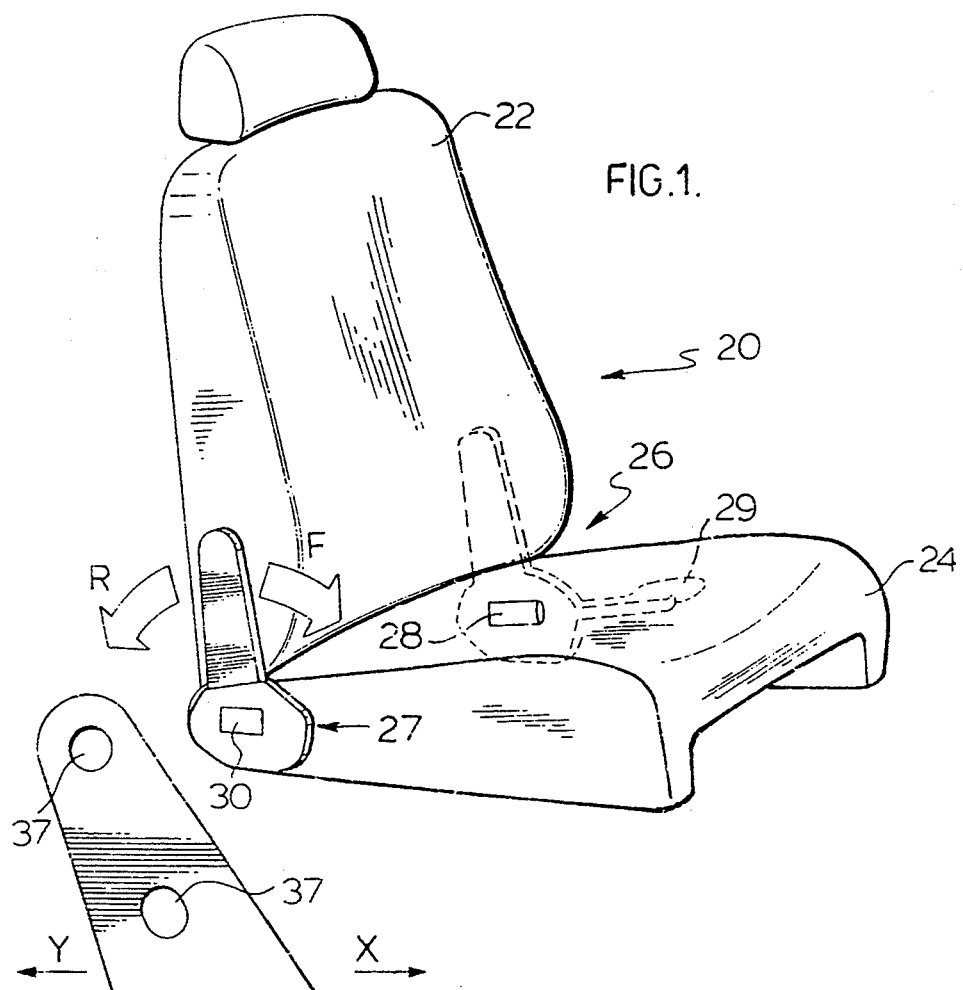
FIG. 1 is a perspective view of a vehicle seat assembly having an inertial latching mechanism according to the invention operatively mounted on one side thereof.

Reference will now be made to FIG. 1 which shows a typical vehicle seat assembly 20 having a seatback member 22 pivotally movable with respect to a seat member 24. The seatback member 22 and the seat member 24 are pivotally attached one to the other by a first pivoting hinge mechanism 26 mounted on the left side of the seat assembly 20 and a second pivoting hinge mechanism 27 mounted on the right side of seat 20. Incorporated in conjunction with the first pivoting hinge mechanism 26 is any well known mechanical latching mechanism 28 having a release lever 29 that may be manipulated by the seat occupant to release the latching mechanism 28 so that the seatback member 22 may be pivotally moved, in the direction of arrows F (forward) and R (rearward), so as to, respectively, dump or recline the seatback member as required. Incorporated into the second pivoting hinge mechanism 27 is an inertial latching mechanism according to the present invention designated by the general reference numeral 30, which will now be described in detail with specific regard to FIGS. 2a, 2b, 3 and 4.

Figure 2A:
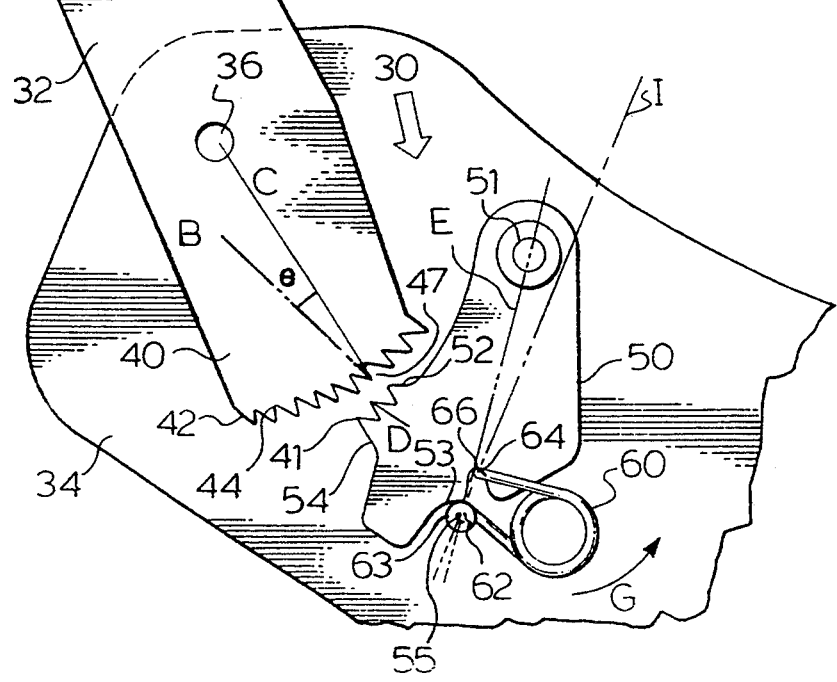
FIG. 2a is a partially cut-away side elevational view of the inertial latching mechanism of FIG. 1 shown in its unlatched position.
Figure 2B:
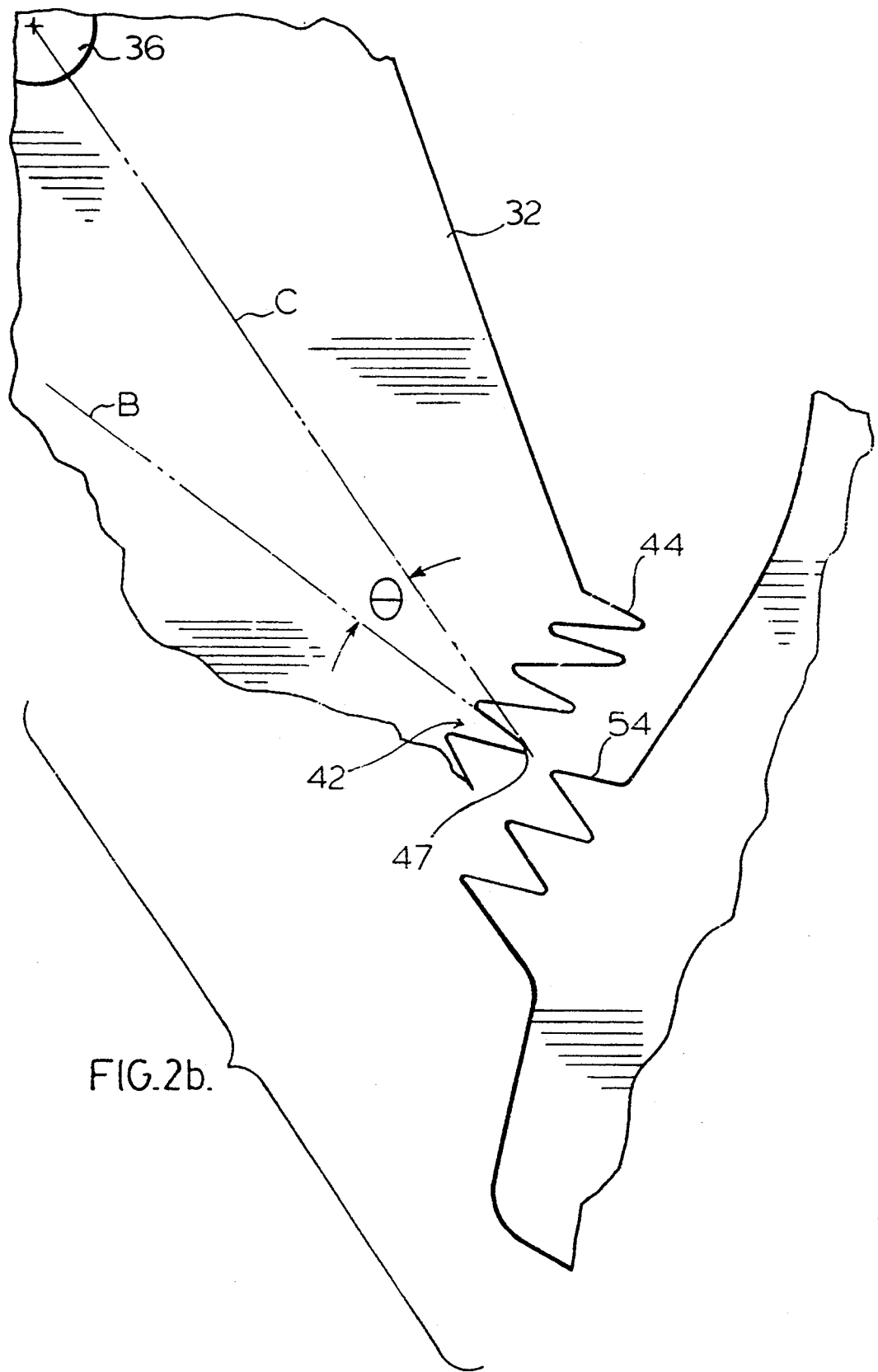
Figure 3:
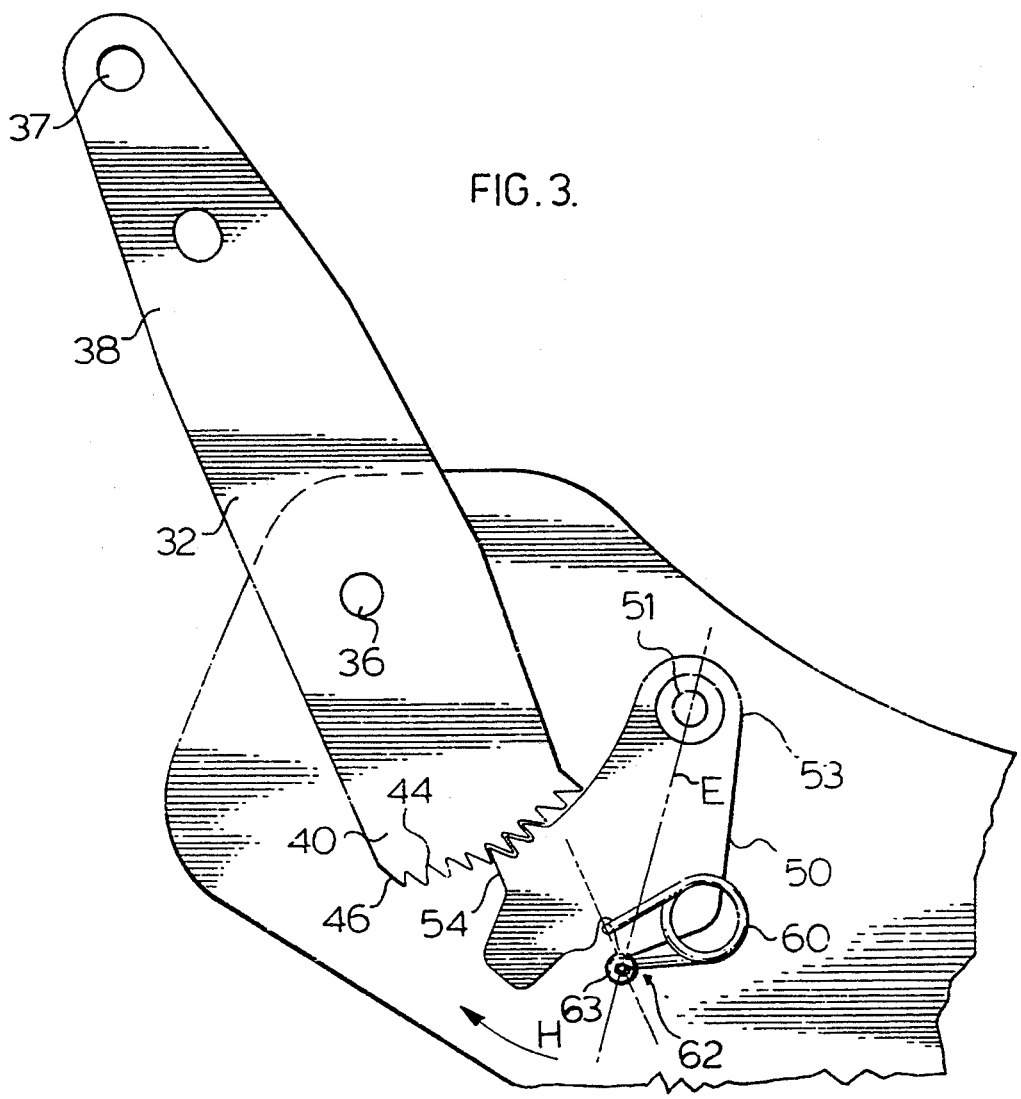
FIG. 3 is a view similar to FIG. 2a, showing the inertial latching mechanism of FIG. 1 in its latched position; and, FIG. 4 is a partially cut away oblique view of the inertial latching mechanism of FIG. 3.
Figure 4:
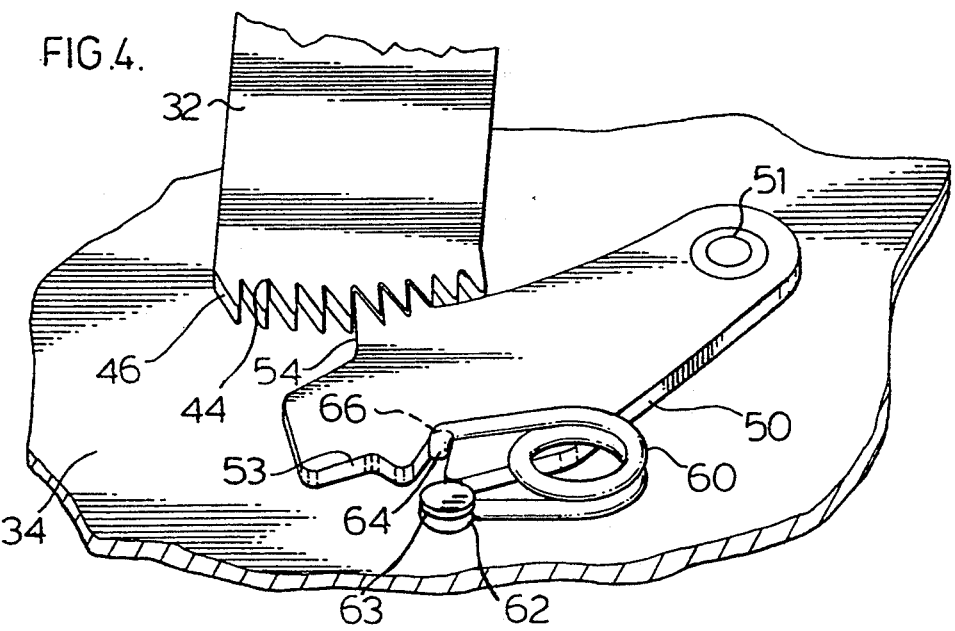

FIGS. 2a and 2b show the inertial latching mechanism 30 of the present invention in the unlatched position. FIGS. 3 and 4 show the inertial latching mechanism 30 of the present invention in the latched position. It should be understood that in FIGS. 2a and 3 the arrow Y indicates a first direction (rearward as shown) and the arrow X indicates a generally opposite second direction (forward as shown).

The inertial latching mechanism 30 comprises a first hinged member 32 and a second hinged member 34 that are pivotally mounted about a common first pivot 36. The first hinged member 32 is rigidly connected at its upper portion 38 to the frame (not shown) of the seatback member 22 by conventional fastening means (not shown) acting through the opening of connecting holes 37, 37. At the lower end 40 of the first hinged member 32 is a first gear rack 42. The first gear rack 42 has a series of teeth 44 that are oriented at an angle $\theta$, referred to as an undercut angle, which is measured between the line B of each tooth 44 and line C which extends from the common first pivot 36 to the apex 47 of each the teeth 44 (See FIGS. 2a and 2b). This angling of the teeth 44 allows for the inertial latching mechanism 30 to latch the seatback member 22 with respect to the seat member 24, such that the seatback member 22 cannot be further reclined after latching has occurred, at least until such time as the inertial latching mechanism 30 has been reset to its unlatched position by service personnel.

Such undercut angling is also effective to rectify the problem of tip-to-tip engagement of the teeth 44 with the teeth 54, which tip-to-tip engagement could result in failure to latch. If tip-to-tip engagement does initially occur, it will be altered by continued movement of the first hinged member 32 about common first pivot 36 in the direction of arrow R (of FIG. 1) and by the angled orientation of the teeth 44. The continued movement of the first hinged member 32 in this manner causes transverse displacement of the teeth 44 with respect to the teeth 54, thus quickly moving them out of tip-to-tip engagement. The angular orientation of the teeth 44 means that the continued movement of the first hinged member 32 also helps force the teeth 44, 54 to mesh together, once they are out of tip-to-tip engagement.

Pawl means 50 is pivotally mounted on the second hinged member 34 at a second pivot 51, which is distanced from the first pivot 36. The pawl means 50 is pivotally mounted at the top portion thereof and the center of mass of the pawl means 50 is located therebelow such that the pawl means 50 acts as a pendulum. The pawl means 50 has an engaging portion in the form of a second gear rack 52 located facing the first gear rack 42 of the first hinged member 32. The teeth 54 are of a similar size and shape to the teeth 44 of the first gear rack 42 and are preferably oriented for positive engagement with teeth 44 by having their prospective apices aligned with tooth bisecting line D, which line is substantially tangential to a respective circumference about the second pivot 51.

The pawl means 50 is biased into the unlatched position, as shown in FIG. 2a, by a spring means 60, which is preferably a torsion spring. In the unlatched position, a forwardly oriented surface 53 of the pawl means 50 abuts against a stop pin 55. The stop pin 55 is rigidly connected to the second hinged member 34. The spring means 60 is operatively connected between the second hinged member 34 at its first end 62 and the pawl means 50 at its second end 64. The first end 62 of the spring means 60 is pivotally mounted around stop pin 55, which has an enlarged head portion 63 thereon to keep the first end 62 of the spring means 60 retained thereon. Line I of FIG. 2a is the line between the first end 62 and the second 64 of the spring means 60, and therefore defines the line of action of the force generated by spring means 60 when in the position shown in FIG. 2a. Line E between the center of the aperture 63 and the center of the second pivot 51 defines a transition position for the pawl means 50 when the second end 64 of the spring means 60, which is pivotally engaged with the pawl means 50 at a "U"-shaped contact surface 66, is aligned between the first end 62 and the second pivot 51. Thus, the spring means 60 tends to rotate the pawl means 50 in a second rotational direction, indicated by arrow G, about the second pivot 51, when the contact surface 66 is to the right of line E, as shown in FIG. 2a.

When the pawl means 50 crosses the line E, it is biased by the spring means 60 so as to rotate in the direction of arrow H (see FIG. 3) toward its latched position, as shown in FIGS. 3 and 4. In the latched position, the teeth 54 of the second gear rack 52 are intermeshed with the teeth 44 of the second gear rack 42.

Preferably, when the pawl means 50 moves from the unlatched position illustrated in FIG. 2a to the latched position of FIGS. 3 and 4, the spring means 60 becomes oriented so as to bias the pawl means 50 generally directly toward the first gear rack 42 on the first hinged member 32. This helps the teeth 54 of the second gear rack 52 on the pawl means 50 engage with the teeth 44 of the second gear rack more quickly, thus providing for very quick latching. This is accomplished by having the ratio of the distance between the first end 62 of the spring means 60 and the second end 64 of the spring means 60 at the contact surface 66 to the distance between the contact surface 66 at the second end 64 of the spring means 60 and the second pivot 51 from about 1:2 to about 1:10, preferably about 1:5.

Moreover, the biasing of the pawl means 50 to the latched configuration, together with the undercutting of the teeth 44, as previously described, help to prevent "bounce out" of the pawl means 50 from latching engagement with the teeth 54 as may occur with other known types of inertial latches after a secondary collision of the vehicle in which the inertial latch is mounted. Such unlatching in other inertial type latches typically occurs by reason of "load lapse", on the inertial pawl during, for example, sudden reversal of vehicle direction under a secondary collision, or extremely rough road conditions. The present inertial latching mechanism 30, once latched as shown and described, will not unlatch under such a "load lapse".

Under normal driving conditions of a vehicle (not shown) having the inertial latching mechanism 30 installed therein, the pawl means 50 remains in its unlatched position as shown in FIGS. 2a and 2b. It is held in this position by the biasing force from the compression of the spring means 60. The line of action of this biasing force transmitted by the spring member 60 to the pawl means 50 is indicated by broken line I of FIG. 2a.

When the vehicle suddenly undergoes rapid forward acceleration in the second direction (illustrated by arrow X of FIG. 2a) above a design threshold value, such as, for example, in a rear end collision, the seatback member 22, the seat member 24, the first hinged member 32 and the second hinged member 34 experience that same acceleration. Under these conditions, the seatback member 22 tends to pivotally move rearwardly in the first direction (illustrated by arrow Y of FIG. 2a), which in turn tends to rotate the first hinged member 32 in the direction of arrow R of FIG. 1. The seatback member 22 is precluded from such rearward movement by the prior art mechanical latching mechanism 28 and by actuation of the inertial latching mechanism 30 of the present invention, which provides supplemental latching to help preclude the seatback member 22 from moving rearwardly and from distorting or breaking under the inertial force of the occupant's torso.

Under such rapid forward acceleration, the top portion of the pawl means 50 is accelerated by the second pivot 51. The lower portion of the pawl means 50 is not accelerated as quickly as the top portion, thus causing pivotal movement about the second pivot 51. Thus, the lower portion of the pawl means 50 swings in the direction of arrow H, relative to the first and second hinged members 32,34, such that the contact surface 66 of the pawl means 50 moves from its position along line I (as seen in FIG. 2a) toward alignment with the line E. In order to accomplish such movement, the inertial force of the pawl means 50 must overcome the biasing force of the spring member 60 during said rapid acceleration of the vehicle.

As the contact surface 66 reaches the transition position at line E, the biasing force of the spring means is directed through the second pivot 51. As the contact surface 66 passes line E, the biasing force of the spring means 60 tends to rotate the pawl means 50 in the direction of arrow H about the second pivot 51, toward the lower end 40 of the first hinged member 32. Correspondingly, the second gear rack 52 is pushed toward the first gear rack 42. As the second gear rack 52 reaches the first gear rack 42, the teeth 52 of the second gear rack 52 intermesh with the teeth 44 of the first gear rack 42. In this manner, the first hinged member 32 becomes latched by the second hinged member 34 to secure said seatback member 22 against pivotal movement in the direction of arrow R relative to said seat member 24. Once latched, the first hinged member 32 and the seatback member 22 cannot be rotated rearwardly until the pawl means 50 is manually moved back to its unlatched position.

In some instances, the ends of one or more of the teeth 54 of the second gear rack 52 may hit directly on the ends of one or more of the teeth 44 of the first gear rack 42 in tip-to-tip engagement. To avoid tip-to-tip engagement, the teeth 44 of the first gear rack 42 are, in the preferred embodiment illustrated, oriented at an angle $\theta$, so that the teeth 54 of the second gear rack 52 can slide off the ends of the teeth 44, thus allowing the two sets of teeth to mesh with one another, thereby allowing for positive engagement of the second gear rack 52 in the second gear rack 42, even when tip-to-tip engagement is initially encountered during locking up of the latching mechanism 30.

It should be understood that extremely rapid forward acceleration in the direction indicated by arrow F—in the order of about 2g to about 10g (2 to 10 times the acceleration due to gravity)—is typically caused by a rear end collision. Rear end collisions usually involve a first vehicle colliding into the rear end of a slower moving or stopped second vehicle. The second vehicle undergoes rapid forward acceleration once hit by the first vehicle. Alternatively, a rear end collision could involve a vehicle moving rearwardly and colliding with another vehicle or stationary object. In this latter case, the vehicle undergoes rapid deceleration, which is the same as relative acceleration in a forward direction, as far as the terms are used herein.

It has been found that in such rear collisions a vehicle typically undergoes acceleration in the order of 2g to 10g. The inertial latching mechanism 30 of the present invention preferably has a design threshold value of about 7g. When a vehicle having the inertial latching mechanism 30 of the present invention undergoes acceleration of greater than the design threshold value, the pawl means 50 moves in the direction of arrow H as described, from its unlatched to its latched position, thus latching the seatback member 22.

While but a single preferred embodiment of inertial latching mechanism according to the invention is shown and described herein, it is to be understood that various modifications and rearrangements may be resorted to without departing from the scope of the invention disclosed and claimed. For example, it is specifically contemplated that a spring means in tension could be used to bias the pawl means in place of the spring means shown. It is also specifically contemplated that the pawl and spring means could be dimensioned and configured such that the inertial forces of the spring means or the resultant inertial forces of the combination of the pawl means and the spring means could be used to overcome the biasing of the spring means and effect movement of the pawl means from the unlatched position to the latched position. It is also specifically contemplated that the inertial latching mechanism illustrated could be dimensioned, configured and otherwise modified to be useful in latching a seatback against forward dumping of the seatback member in frontal impact vehicle collisions, particularly where it is used as a supplementary latch to be activated only under conditions of severe vehicle deceleration, as for example, are sufficient to activate supplementary restraint vehicle safety systems, such as passenger air-bags.

I claim:

1. An inertial latching mechanism for use in a vehicle seat assembly having a seatback member pivotally movable with respect to a seat member, wherein said latching mechanism is used to secure said seatback member against pivotal movement relative to said seat member in a first direction when a vehicle in which said seat assembly is mounted undergoes acceleration in a generally opposite second direction greater than a design threshold acceleration value, said latching mechanism comprising:

first and second hinged members pivotally mounted about a common first pivot with said first hinged member having a first gear rack arranged thereon, wherein one of said first and second hinged members is mounted on one of said seat and seatback members and the other of said first and second hinged members is mounted on the other of said seat and seatback members;

a pawl means having an engaging portion adapted for latching engagement with said gear rack, said pawl means being mounted on said second hinged member for movement between a first latched position whereat said pawl means engages said gear rack to secure said first hinged member as aforesaid, a second transitional position, and a third unlatched position whereat said pawl means is disengaged from said gear rack;

a spring means interconnected at all times between said second hinged member and said pawl means so as to retain said pawl means in said third unlatched position until said vehicle undergoes acceleration in said second direction above said design threshold value, above which value the inertial forces of the pawl means overcome said retention, thereby to cause relative movement of said pawl means in said first direction past said second transitional position, beyond which second transitional position said spring means is interconnected as aforesaid to bias said pawl means toward said first latched position and to hold said pawl means in said first latched position.

2. The inertial latching mechanism of claim 1, wherein said pawl means is pivotally mounted on said second hinged member for pivotal movement between said first latched position, said second transitional position and said third unlatched position.

3. The inertial latching mechanism of claim 2, wherein said pawl means is pivotally mounted on said second hinged member about a second pivot distanced from said common first pivot.

4. The inertial latching mechanism of claim 3, wherein a first end of said spring means is pivotally mounted on said second hinged member and a second end of said spring means is in operative pivotal engagement at all times with said pawl means at a contact surface on said pawl means.

5. The inertial latching mechanism of claim 4, wherein said spring means is pivotally mounted at a distance from said second pivot.

6. The inertial latching mechanism of claim 5, wherein, at said second transitional position, the line of action defined between the first and second ends of the spring means is aligned with a center line passing through said spring pivotal mount and said second pivot.

7. The inertial latching mechanism of claim 5, wherein said spring means is interconnected as aforesaid such that the ratio of the distance from said first end of said spring means to said second end of said spring means at said contact surface to the distance from said contact surface of said pawl means to said second pivot is such that when said pawl means moves from said third unlatched position to said first latched position, said spring means becomes oriented so as to bias said pawl means generally directly toward said first gear rack.

8. The inertial latching mechanism of claim 7, wherein said spring means is interconnected as aforesaid such that the ratio of the distance from said first end of said spring means to said second end of said spring means at said contact surface to the distance from said contact surface of said pawl means to said second pivot is about 1:5.

9. The inertial latching mechanism of claim 7, wherein said spring means is interconnected as aforesaid such that the ratio of the distance from said first end of said spring means to said second end of said spring means at said contact surface to the distance from said contact surface of said pawl means to said second pivot is from about 1:2 to about 1:10.

10. The inertial latching mechanism of claim 4, wherein the center of gravity of said pawl means is below said second pivot, thereby allowing said pawl means to act as a pendulum.

11. The inertial latching mechanism of claim 10, wherein when said vehicle is subjected to accelerative forces in said second direction greater than said design threshold value, the biasing force of said spring means that retains said pawl means in said third unlatched position is overcome, the pawl means swings in said first rotational direction relative to its pivotal mount, past said center line, beyond which center line said spring means biases said pawl means in a first rotational direction about said pivotal mount toward said first latched position.

12. The inertial latching mechanism of claim 11, wherein said engaging portion of said pawl means is a second gear rack configured to cooperatingly engage with said first gear rack.

13. The inertial latching mechanism of claim 12, wherein the teeth of said first gear rack are oriented with respect to said common pivot of said first hinged member at an angle offset thereto whereby tip-to-tip engagement of the teeth of said first gear rack with the teeth of said second gear rack is precluded.

14. The inertial latching mechanism of claim 13, wherein the teeth of said first gear rack are angled with respect to a line from said teeth to said common first pivot in the same direction as the direction of rotation of the first hinged member when said seatback is recliningly rotated.

15. The inertial latching mechanism of claim 4, wherein said spring means is in compression.

16. The inertial latching mechanism of claim 1, wherein said threshold value is between about 2g and about 10g.

17. The inertial latching mechanism of claim 16, wherein said threshold value is between about 5g and about 9g.

18. The inertial latching mechanism of claim 17, wherein said threshold value is about 7g.

19. The inertial latching mechanism of claim 1, wherein said spring means is a torsion spring.

20. The inertial latching mechanism of claim 1, wherein said pawl means is mounted in a slidable mount on said second hinged member for generally slidable translational movement between said first latched position, said second transitional position and said third unlatched position and wherein said spring means biases said pawl means in said first direction within said slidable mount toward said first latched position and retains said pawl means in said third unlatched position as aforesaid.

21. An inertial latching mechanism for use in a vehicle seat assembly having a seatback member pivotally movable with respect to a seat member, wherein said latching mechanism is used to secure said seatback member against pivotal movement relative to said seat member in a first direction when a vehicle in which said seat assembly is mounted undergoes acceleration in a generally opposite second direction greater than a design threshold acceleration value, said latching mechanism comprising:

first and second hinged members pivotally mounted about a common first pivot with said first hinged member having a first gear rack arranged thereon, wherein one of said first and second hinged members is mounted on one of said seat and seatback members and the other of said first and second hinged members is mounted on the other of said seat and seatback members;

a pawl means having an engaging portion adapted for latching engagement with said gear rack, said pawl means being mounted on said second hinged member for movement between a first latched position whereat said pawl means engages said gear rack to secure said first hinged member as aforesaid, a second transitional position, and a third unlatched position whereat said pawl means is disengaged from said gear rack;

a spring means interconnected at all times between said second hinged member and said pawl means so as to retain said pawl means in said third unlatched position until said vehicle undergoes acceleration in said second direction above said design threshold value, above which value the resultant inertial forces of the combination of the pawl means and the spring means overcomes said retention, thereby to cause relative movement of said pawl means in said first direction past said second transitional position, beyond which second transitional position said spring means is interconnected as aforesaid to bias said pawl means toward said first latched position and to hold said pawl means in said first latched position.

22. In a vehicle seat assembly having a seatback member pivotally movable with respect to a seat member, an inertial latching mechanism to secure said seatback member against pivotal movement relative to said seat member in a first direction when a vehicle in which said seat assembly is mounted undergoes acceleration in a generally opposite second direction greater than a design threshold acceleration value, said latching mechanism comprising:

first and second hinged members pivotally mounted about a common first pivot with said first hinged member having a first gear rack arranged thereon, wherein one of said first and second hinged members is mounted on one of said seat and seatback members and the other of said first and second hinged members is mounted on the other of said seat and seatback members;

a pawl means having an engaging portion adapted for latching engagement with said gear rack, said pawl means being mounted on said second hinged member for movement between a first latched position whereat said pawl means engages said gear rack to secure said first hinged member as aforesaid, a second transitional position, and a third unlatched position whereat said pawl means is disengaged from said gear rack;

a spring means interconnected at all times between said second hinged member and said pawl means so as to retain said pawl means in said third unlatched position until said vehicle undergoes acceleration in said second direction above said design threshold value, above which value the inertial forces of the pawl means overcome said retention, thereby to cause relative movement of said pawl means in said first direction past said second transitional position, beyond which second transitional position said spring means is interconnected as aforesaid to bias said pawl means toward said first latched position and to hold said pawl means in said first latched position.

* * * * *